Figure 1:
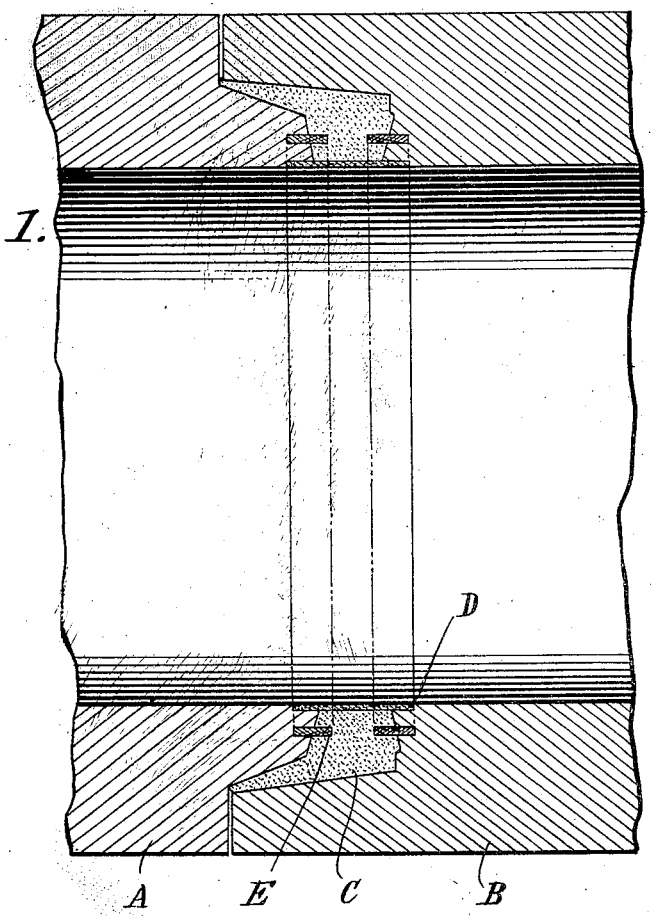

A. M. HIRSH.
JOINT FOR CONCRETE PIPES.
APPLICATION FILED FEB. 5, 1916.

1,206,111.

Patented Nov. 28, 1916.

A. M. Hirsh
Inventor

By his Attorneys
Kerr, Page, Cooper & Hayward

UNITED STATES PATENT OFFICE.

ALLAN M. HIRSH, OF MONTCLAIR, NEW JERSEY.

JOINT FOR CONCRETE PIPES.

1,206,111.  Specification of Letters Patent.  Patented Nov. 28, 1916.

Application filed February 5, 1916. Serial No. 76,280.

*To all whom it may concern:*

Be it known that I, ALLAN M. HIRSH, a citizen of the United States, residing at Montclair, in the county of Essex and State of New Jersey, have invented certain new and useful Improvements in Joints for Concrete Pipes, of which the following is a full, clear, and exact description.

It is a well known fact that concrete pipes composed of previously molded sections laid and joined after the manner of sectional pipe of other materials may not, however carefully the joints be cemented or luted, be made to resist the pressure of water flowing through them without special means to prevent it in the form or character of joints, very few of which have ever been devised that were suitable for the purpose.

Variations of temperature which cause expansion and contraction of the pipe when laid, lateral displacement of sections due to many disturbing causes, and other, often unexpected, reasons for which it is extremely difficult to make proper provision, all contribute to form cracks in or at the joints, which, although they may be exceedingly minute, will nevertheless result in a leakage which becomes more serious in proportion to the pressure to which the pipe is subjected. After a long course of experiments and tests with pipes of this character I have succeeded in producing joints for molded concrete pipe sections which obviate this difficulty, and this application is based upon one form of such joint that I have devised.

In carrying out this invention I may use pipe sections molded in a great variety of forms with special regard to the joint between them, and the invention is generally applicable to bell and spigot, butt and other forms of joint, provided these be made with the specific means for utilizing the novel feature which I have designed and which may be thus generally described.

In the case of any two abutting pipe sections, whatever may be the specific form of the joint, I so shape the abutting ends that when the sections are brought together there is formed a space of substantially greater dimensions than that ordinarily existing between contiguous ends of the sections and occupying generally a portion only of the whole joint. For example, in the case of a bell and spigot joint the bell flange is made longer than that of the spigot so that at each joint, when the pipe is laid, there exists between the spigot end and the main body of the pipe a recess or space, whether inside or outside the pipe is immaterial, which is to be filled with some plastic material such as grout or comparatively fine cement to complete the joint. When such pipe sections are molded I form in the surfaces of the two more widely separated end portions, grooves into which I introduce some substance which will expand under the influence of moisture. There are, or there may be found, numerous substances which fulfil this requirement, but that which I prefer is wood, and when a section is completed, there will be present a ring or continuous strip of such wood inserted in the grooves at its opposite ends. When such sections are laid and joined these strips of wood will extend into the recess or widened chamber at the joint, which latter is then filled with a plastic material such as cement in the usual manner. So long as this filling retains its homogeneous character and is unbroken, the joint which it forms is substantially water tight, but, as above explained, it is liable to crack, and in such cases these cracks always occur, not through the body of the material constituting the plastic filler, but close to the ends of the original pipe sections. When such cracks occur, the water forced through them meets the strips of wood extending into the filler and swells the latter so that they completely fill and seal that portion of the filler between the original pipe and its main body and effectually prevent the passage of water which would otherwise result in leakage. Such a joint is permanent, as under the conditions met with the character of the wood, except for contraction or expansion under varying degrees of moisture, never materially changes.

In the accompanying drawing I have illustrated the invention in such forms of pipe as are necessary to show its general applicability.

Figure 2:
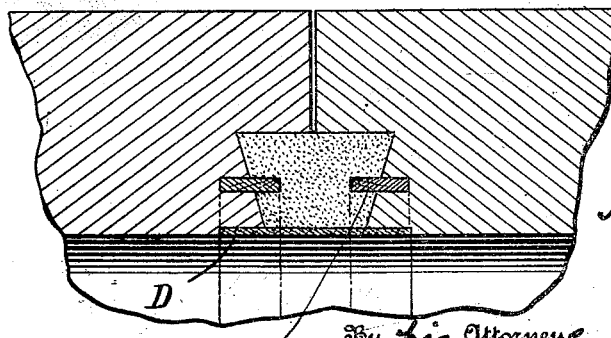

Figure 1 is a sectional view of a joint between two abutting pipe sections, made in accordance with my invention, and Fig. 2 is a similar sectional view of a different form of joint to which the improvement is applied.

A and B represent respectively, in Fig. 1, the spigot and bell ends of two sections of concrete pipe, which are so formed that when brought together they will form a recess, preferably on the inside of the pipe, which is then filled with cement or grout C. The seal thus formed is preferably perfected by a comparatively thin layer D, of very finely sifted cement. Such a joint has been found, in practice, to be almost absolutely water tight in pipes for conveying water under pressure, but should the sections be exposed to marked variations of temperature, or one should sink or rise more than the other, it has been found that the cement seal is liable to crack and leak, although the cracks may not be visible to the naked eye. This may be remedied by forming in each surface of the abutting ends and within the cement filled recess, a groove, and inserting into such groove a continuous strip of wood E. When the pipes are laid the recess, into which these strips project, is then filled with cement in the usual way, with the result that the wooden strips are embedded in such filler. In such case should any cracks occur, they are invariably close to the ends of the pipe sections, and if any water passes through them, it encounters and swells the wood, which acts as a seal and stops entirely the flow of water.

The improvement may be applied to many other forms of pipe. For example, Fig. 2 shows an ordinary butt joint but with a recess formed thereat which is filled with cement C and covered with a layer of very fine neat cement D. In this, as in the other cases, grooves are formed in the ends of the sections to receive the strips of wood E, which perform their intended functions in the manner above set forth.

The process, or in large measure the material of which the pipe is composed, are immaterial. I may also use any other material than wood if it be capable of operating in the same way and with the same result.

What I claim is:—

1. A watertight joint for concrete pressure pipes composed of a body of plastic material filling the space or recess between adjacent pipe sections, into which body project from grooves in the ends of said sections, and are embedded therein, continuous strips of material adapted to expand under the influence of moisture.

2. A pipe composed of molded sections of concrete having spaces or recesses between abutting ends, sealing fillers of plastic material, such as cement contained in said recesses, and continuous strips of wood embedded in grooves in the ends of the sections and extending into the body of the filler, as set forth.

3. A pipe composed of molded sections of concrete recessed or shaped at their ends to form across portions of each joint a space or recesses, sealing fillers of cement in such recesses, and strips of wood embedded in continuous grooves in the ends of the pipe sections and extending into the body of the cement fillers.

In testimony whereof I hereunto affix my signature.

ALLAN M. HIRSH.